United States Patent [19]
Hirschmann et al.

[11] 3,846,399
[45] Nov. 5, 1974

[54] PROCESS FOR CONTROLLED STEPWISE SYNTHESIS OF POLYPEPTIDES

[75] Inventors: Ralph F. Hirschmann, Scotch Plains; Robert G. Denkewalter, Westfield, both of N.J.

[73] Assignee: Merck & Co., Inc., Rahway, N.J.

[22] Filed: Mar. 1, 1971

[21] Appl. No.: 120,063

Related U.S. Application Data

[63] Continuation of Ser. No. 816,177, April 10, 1969, abandoned, which is a continuation of Ser. No. 469,310, July 2, 1965, abandoned.

[52] U.S. Cl............................... 260/112.5, 424/177
[51] Int. Cl.......................................... C07c 103/52
[58] Field of Search................................. 260/112.5

[56] References Cited
OTHER PUBLICATIONS

Bailey, Nature 164, (1949), pg. 889.
Bartlett et al., J. Am. Chem. Soc. 79, 2153–2159, (1957).
Bartlett et al., J. Am. Chem. Soc. 79, 2154–2160, (1957).
Knobler et al., J. Chem. Soc., 1964, pp. 3941–3951.

*Primary Examiner*—Elbert L. Roberts

[57] ABSTRACT

The invention disclosed herein relates to a novel process for the controlled, stepwise synthesis of polypeptides and proteins. More particularly, it is concerned with a process for the rapid and efficient preparation of polypeptides in which multiple sequential steps are carried out without isolation of intermediate peptides. This process for the controlled stepwise synthesis of polypeptides involves reacting a starting amino acid or peptide (or derivative thereof) with an N-carboxy amino acid anhydride (or derivative thereof) in an aqueous medium under conditions of controlled pH such that the only amino group present in appreciable concentration in reactive form during the course of the reaction is the amino group in the starting amino acid or peptide.

9 Claims, No Drawings

PROCESS FOR CONTROLLED STEPWISE SYNTHESIS OF POLYPEPTIDES

This application is a continuation of Ser. No. 816,177, filed Apr. 10, 1969, now abandoned, which is a continuation of Ser. No. 469,310, filed July 2, 1965, now abandoned.

Polypeptides are a large class of chemical compounds comprising dipeptides, tripeptides, tetrapeptides and higher peptides in which amino acids are joined one to the other by amide linkages (peptide bonds). A very large number of them have been isolated by partial hydrolysis of proteins. A few high molecular weight polypeptides have been prepared chemically. Many relatively low molecular weight polypeptides containing, for example, up to six to eight amino acids have also been prepared. Proteins are largely polypeptides usually containing one hundred or more amino acid segments joined together.

Polypeptides are useful not only as stepping stones for the synthesis of proteins but also because certain of them are therapeutically active. They are also useful in the study and analysis of proteins. One of the most fruitful approaches to the study of protein structure has been partial hydrolysis of the protein followed by isolation and analysis of the polypeptide fragments produced. Such procedures provide a very limited amount of information regarding the structural-functional relationships and requirements in polypeptides and proteins. Exact information of this nature could be obtained by the synthesis of polypeptides in a controlled stepwise manner.

Moreover, such studies as have been carried out do not give insight into the mode of action of enzymes, hormones and other proteins with important body functions. Neither do they give information which might permit the preparation of useful variants of natural proteins, nor any information which will permit the preparation of therapeutic agents specifically tailored to interact with natural proteins in a useful way.

One of the most challenging problems of modern biology is to gain new insight into the mode of action of enzymes, hormones and other physiologically active proteins. Relatively little is known about the relationship between chemical structure and biological activity of these important substances. For example, there is a paucity of information about specific activity sites in enzymes, the reasons for the specificity and the functions of those sections of the enzymes which seen to have no apparent role in enzymatic reactions. Not one single enzyme has ever been chemically synthesized. The presently available methods are completely inadequate for gaining insight into these chemical structure-biological activity problems since they can not be used without the expenditure of many man years efforts to prepare the large number and varied analogs of naturally occurring physiologically active substances which would be required to gain such insight.

Although a number of synthetic methods have been proposed, no ideal method for the synthesis of polypeptides has yet been discovered. No successful method of synthesis has been devised which permits the formation of successive peptide bonds in a growing peptide chain and which avoids the often difficult step of selective removal of the protecting group without the necessity of isolation of intermediates at each successive step. Such methods as have been employed have been tedious, expensive and time consuming. For the formation of a simple dipeptide by the reaction between two different amino acids, best known prior art methods require blocking the amino group of one amino acid and the carboxyl group of the other so that selective reaction will take place to produce only the desired dipeptide from among the four potential products. In addition the carboxyl group which is to react generally requires activation by conversion to an acid halide or some other modification which is more reactive than the carboxyl group. The two molecules are then condensed to form the dipeptide and finally the blocking groups are removed. The reactions then, require (1) placement of the blocking groups, (2) activation of the carboxyl group, (3) condensation, and (4) removal of the blocking groups. The whole process must be repeated to add just one more amino acid to the dipeptide, and repeated again and again to add successive amino acid segments. Moreover, to prepare polypeptides for truly meaningful study it is usually necessary to avoid racemization of the amino acids and peptides during these reactions so as to prepare optically pure products. It has been calculated that the probability of obtaining an optically pure L-decapeptide from a starting material which contains only 1 percent of the wrong optical isomer is only 0.35. The probability reduces to $3 \times 10^{-5}$ when the same starting material is proposed for the preparation of a product containing only 100 amino acid segments — a relatively simple protein. When this racemization problem is considered together with the fact that overall yields in peptide synthesis are very low and the fact that there are over $10^{26}$ possible polypeptides containing only twenty different amino acid segments, it is small wonder that, despite the recognized importance of such products, very few large polypeptides and simple proteins have actually been prepared. Such products as have been prepared have required several man years for completion. Insulin has been worked on by several groups of scientists throughout the world and its successful synthesis was the result of ten years efforts on the part of one of these groups.

A method which has received considerable attention for the uncontrolled synthesis of homopolymers such as polyalanine and polyglutamic acid of varying molecular weights and uncontrolled synthesis of heteropolymers with randomly arranged amino acid segments is the N-carboxy anhydride procedure, referred to herein as the NCA method. These polymerization reactions have been carried out in organic solvents using catalytic amounts of base. The products prepared bear a superficial resemblance to natural proteins in some of their physical properties but are of practically no value in the study of the chemical and physiological properties of proteins. Moreover, the procedures are not applicable to the preparation of heteropeptides of known structure and molecular weight containing specifically defined amino acids in predetermined positions in the peptide chain.

Others, because of the ease with which homopeptides are formed have speculated that the NCA method might be applicable to the controlled, stepwise synthesis of heteropeptides. In fact early attempts were made to adapt the method to the synthesis of low molecular weight heteropeptides in organic solvents. The method has never been used in aqueous media in the controlled, stepwise synthesis of heteropeptides in which two or more amino acids have been added in successive steps to a growing peptide chain. It has, in fact, been the conclusion of those who have suggested such successive reactions that stepwise synthesis of polypeptides by the NCA method is impossible because the relative rates of the main reaction and the side reactions could not be controlled.

We have found that it is possible to use the NCA method to prepare heteropeptides. In this method, a starting amino acid is first converted to an N-carboxy amino acid anhydride. This conversion has two advantages. It blocks the amino group and activates the carboxyl group at the same time. The anhydride is then reacted with another amino acid or peptide to form an N-carboxy dipeptide or higher peptide which converts to the desired compound on decarboxylation. In organic solvents, in the presence of a base, such decarboxylation takes place so easily that the reactions cannot be controlled with the result that polymers and other undesired products are formed. We have found that such uncontrolled reaction can be avoided in water.

The use of aqueous media would be ideally suited for controlled, stepwise synthesis of polypeptides for a number of reasons. A principle reason is that amino acids and peptides are generally soluble in aqueous media and not in organic solvents because they form ionic species, and because, in the case of peptides, they contain hydrophilic amide groups. In addition organic solvents often promote racemization in peptide synthesis and can denature higher peptides. It is also worth noting that peptides and proteins found in nature are almost always in aqueous media.

Control of the NCA process in aqueous media is so difficult that no attempt has ever been made to apply it to the stepwise synthesis of heteropeptides in such media. The principal factors contributing to the difficulty of control are (1) polymerization, (2) over-reaction, (3) hydrolysis of NCA and (4) interference with the reaction by liberated carbon dioxide. Polymerization and over-reaction arise from premature decarboxylation of the intermediate N-carboxy compound so that the product produced is available to compete with the selected starting material for reaction with the N-carboxy anhydride reactant. Similarly, hydrolysis of the starting anhydride leads to incompleteness of reaction due to insufficiency of starting anhydride. Carbon dioxide liberated from any one of the intermediates can react preferentially with the starting material and inactivate it to cause incompleteness of reaction.

Another difficulty which arises in adapting the NCA procedure to stepwise synthesis is really another aspect of the problem of control. It is the difficulty of purification. Unless each successive step in a peptide synthesis is effected so as to control polymerization, incompleteness of reaction and over-reaction, the reaction media becomes contaminated with undesired by-products including reaction products of lesser or greater molecular weights particularly those differing from the desired peptide product by only one or two amino acids. Contamination may also arise from the production of peptides having the same molecular weight but the wrong sequence from that in the desired peptide product. The physical and chemical properties of these by-products are so similar to those of the desired product that separation is extremely difficult and often impossible. Of course, some contaminants can be tolerated, especially those which becasue of differences in physical and chemical properties we have discovered are easily separated from the desired product. Insoluble polymers are readily separated by filtration.

Despite the discouraging results heretofore obtained and the unfavorable conclusions derived from these results, it has now been discovered that the NCA method can be used to achieve peptide synthesis simply and rapidly in water in a controlled, stepwise manner with or without isolation of intermediate peptide products to produce polypeptides such as oxytocin, vasopressin, angiotensin or bradykinin and proteinaceous substances such as adrenocarticotropin and insulin. In addition, the invention allows the synthesis of higher peptides and proteins including enzymes and hormones which could not be produced by heretofore employed methods.

The basic process of this invention for the controlled synthesis of peptides and derivatives thereof having a minimum of two amide linkages in the peptide chain comprises reacting as a starting material an amino compound selected from the group consisting of amino acids, peptides and derivatives thereof containing a free amino grouping, with an N-carboxy amino acid anhydride or derivative thereof by bringing the reactants together in an aqueous medium under controlled conditions such that the only amino group present in appreciable concentration in reactive form during the course of the reaction is the amino group of the amino acid, peptide or derivative which should react to form the desired product, and any other amino group present including those in the peptide product as formed is not, — a key discovery of this invention. Under the carefully controlled conditions of this invention, the reaction between the anhydride and the amino acid, peptide or derivative proceeds at each step of the synthesis with minimum formation of those by-products which would interfere with the next anhydride reaction or with the purification of the desired product. Under the controlled conditions, the intermediate N-carboxy compound is prevented from decarboxylating, or if decarboxylation does take place the resulting amino group is protected by protonation, until substantially all of the starting material has reacted with the anhydride. The result of this careful control is that the reaction with the fastest rate is the one which produces the desired product and the production of unwanted side products, especially those resulting from over-reaction and polymerization is maintained within limits which do not interfere with subsequent steps in the controlled synthesis. Following decomposition of the N-carboxy intermediate and any unreacted anhydride, the peptide product so formed can be further reacted with another anhydride under similar reaction conditions without isolation of intermediates. The invention is broadly applicable to the preparation of dipeptides in yields which are normally as high as 95 to 98 percent and are often essentially quantitive, as well as to the preparation of polypeptides and proteins of predetermined structure.

The desired result, i.e., the formation of a new peptide bond is obtained by bringing together the anhydride and the starting material in separate phases, conveniently by addition of solid anhydride to an aqueous solution of the starting material, under controlled conditions of temperature, rate of mixing and hydrogen ion concentration such that the only free amino group present in reactive form in reactive concentration is the amino group which is to join in the formation of the peptide bond and the amino group of the product as formed is protected.

In the reaction mixture for the preparation of a peptide one or more amino groups may be present in addition to the amino group which must react to form the desired product. These might include, for example, additional basic groups on the anhydride, such as the omega amino group of lysine, the guanadino group of arginine or the imido group of tryptophane. They might also include amino groups on the amino acid or peptide used as a starting material. The amino group of the product, i.e., the amino group generated by decarboxylation of the intermediate carbamate, must also be considered. Any or all of these groups are potentially capable of interfering with the course of the desired reaction by competing for the starting reagent, i.e., the N-carboxy anhydride. It is apparent therefore that the concentration of these potentially interfering groups in their reactive forms as free amines must be kept at a minimum.

For simplicity the discussion will be limited to only two amino groups, A and B. Amino group A is the group which is to react to form the desired product. Amino group B is the potentially interfering group. Several situations might arise depending upon the relative basicity of the two groups. If B is a much stronger base than A, reaction can be affected at a pH at which most of B will be protected by protonation and most of A will be non-protonated and therefore reactive. However, the pH must be high enough to stabilize the carbamate. For the same reason, if the amino group of the formed product generated upon decarboxylation of the carbamate is significantly more basic than the amino group of the starting material, the reaction should be conducted at a pH, so that the product amino group B are protected by protonation and amino group A is not.

If A and B are substantially similar in basicity, then it is not generally possible to increase the concentration of amino group A relative to amino group B by pH adjustment and B must be protected by a blocking group, suitably a carbobenzoxy group. The pH of reaction, however, must still be selected so that other potentially competing amino groups are protected by protonation.

If A is a significantly stronger base than B, the reaction is carried out at a high pH, for example 9 to 11. Under these conditions, group A is in substantial concentration as a free amine. Even though B is present as a free amine the product formed will be the desired product produced by reaction with amino group A.

In both of the last two cases, the pH should be sufficiently high to stabilize the carbamate. The pH should ordinarily be maintained below approximately 11. However, control of pH is critical since above a pH of about 11 the concentration of hydroxyl ion is sufficiently high so that competitive reaction with the N-carboxy anhydride occurs.

In some instances it is not necessary to protect the B amino group. This is often the case with high molecular weight polypeptides where a potentially interfering group is un-reactive due to steric factors.

The reaction is carried out at a protecting pH. The term "protecting pH" encompasses that range of hydrogen ion concentration at which the amino group to react is in appreciable concentration in reaction form, i.e., the form of a free amino group reactive with acylating agents, potentially interfering amino groups are protected, the intermediate carbamate is stabilized or the amino group resulting from its decarboxylation is protonated. It also includes controlling the pH so that hydrolysis of the N-carboxy amino acid anhydride is minimized.

There is an optimum protecting pH for each reaction. Depending upon the particular reaction, this pH may fall between 4 and 11. For reactions in which the carbamate is the protecting group the optimum protecting pH is on the alkaline side, ordinarily from 8 to 10.5. We have discovered that in the case of peptide reactants, the protecting pH for substantially complete reaction may be substantially lower than that for amino acid reactants. If the product is one in which the amino group is protected by protonation the optimum protecting pH is on the acid side, ordinarily from about 4 to 6. Once determined the reaction should be carried out under conditions in which the pH is controlled as closely as possible to the optimum protecting pH. Variations in pH may be followed by a fast responding electrode and it is convenient to control the pH by automatic titration or by external addition of neutralizing reagent. Even with these precautions it is often difficult because of the high rate of reaction to maintain the pH at exactly the optimum protecting pH. Some variation from the optimum protecting pH is acceptable. Preferably, however, the pH will not vary more than 0.2 units from the optimum protecting pH although variation by as much as 0.5 units from the protecting pH may be tolerated.

Probe reactions may be used to determine the protecting pH and as well as the optimum conditions with respect to concentration, temperature, time and molar excess of anhydride which are useful for carrying out the process of this invention. For example, in the preparation of a polypeptide, probe reactions may be run with aliquots of the reaction mixture to prepare the next higher member of the series at a number of different pH's, concentrations, temperatures, reaction times and molar excesses of anhydride. The results are evaluated by determination of ninhydrin color using conventional procedures of thin layer chromatography and paper chromatograph with various solvent combinations such as n-butanolacetic acid-water, secbutanol-acetic acid-water, pyridineisoamyl alcohol-water, phenol-water and isoamyl alcohol-water. The product may be located by using any of a number of color reactions, e.g., the ninhydrin reaction. It is also convenient to utilize radioactive tracer techniques in analyzing the probe reactions. Such techniques allow ready determination of the $R_f$ value for each new product as well as a convenient method for estimating the yield of product and the percent contamination with side products. For example, in the preparation of a high molecular weight polypeptide using radioactive techniques, each new radioactive product can be subjected to the next step in the synthesis and based on radioactive measurements, the yield in this next step under various reaction conditions can be ascertained. For this reason radioactive N-carboxy amino acid anhydrides of each of the commonly used amino acids are prepared and used in probe runs. A convenient reaction quantity for the probe reaction is 1.0 mM of reactants per 15 ml. of aqueous mixture. It is especially useful to prepare a series of labeled compounds for each amino acid labeled with $C^{14}$ carbon, deuterium and with both isotopic elements. These isotopes can be differentially measured by known techniques. This factor permits exact identification of the product.

The reaction is quite rapid and is generally substantially complete in a minute or less. Rarely is it necessary to continue reaction for more than five minutes. If desired, the course of the reaction can be followed by subjecting aliquots to the known hydroxamic test and reaction may be continued until the test is negative indicating that substantially all of the N-carboxy anhydride has reacted.

Amongst the control conditions critical to the present invention, is our discovery that by carrying out each reaction under conditions of intimate mixing, for example with rapid stirring side reactions can be largely eliminated, often with the result that the yields are essentially quantitative. In addition, rapid mixing assures that the N-carboxy anhydride will not react in areas locally depleted in starting material to hydrolyze or polymerize. Such undesirable side reactions are substantial in periods in excess of those specified above. Similarly rapid mixing by facilitating the dissolution of the N-carboxy anhydride shortens the reaction time and avoids decomposition of product carbamate, an undesirable side reaction leading to both over-reaction and inactivation of starting material.

The reaction is normally carried out at a temperature below 10°C., preferably from −5° to 5°C. This is an important aspect of the control necessary for the practice of the invention. The pK value of water decreases with decreasing temperature. At 0°C. the pK value of water is $10^{-15}$. It is apparent that by operating at around 0°C that the hydroxyl ion concentration is decreased without concurrent increase in the hydrogen ion concentration. This important feature of reaction control helps to minimize hydrolysis of the starting N-carboxy anhydride and decarboxylation of the carbamate intermediate.

Equimolar quantities of reactants can often be employed. When the NCA is partially consumed by hydrolysis it is often preferred to use excess anhydride to insure complete conversion of starting amino acid or peptide to product. The optimum excess can be determined by probe reactions. The degree of excess which may vary within wide limits is conveniently varied depending on factors such as the nature of the anhydride, the molecular weight and basicity of the peptide or equivalent reactant. As the molecular weight of the peptide product increase, the use of excess anhydride becomes less and less of a problem because the physical and chemical properties of the desired product differ appreciably from those resulting from hydrolysis of the excess anhydride so that isolation and purification of the polypeptide product can be readily effected.

A special advantage of the process of this invention is the ease of removal of the protecting group. Thus, when the reaction is carried out at a pH such that the product is protected by protonation, decarboxylation occurs spontaneously. A carbamate which is stable under alkaline conditions is readily decarboxylated by reducing the pH by the addition of acids.

When the intermediate requires decarboxylation, it is most conveniently accomplished by adjusting the hydrogen ion concentration of the reaction medium to an acid pH, for example from about 3 to about 5. Alternatively, decarboxylation is effected by allowing the mixture to stand, by slight heating or by freeze drying. These are not preferred procedures however, because of the time involved. Bubbling an inert gas such as nitrogen through the mixture during decarboxylation will aid in the complete removal of carbon dioxide as it forms.

After decarboxylation, an additional amino acid or derivative can be added to the peptide chain by repeating the above-described procedure.

There are a number of methods which can be employed to aid in the control of pH. For example the reaction can be carried out in a buffer. Any of a number of buffering systems can be employed, the selection of a particular buffer being indicated by the protecting pH determined in the probe reaction. Borate and phosphate buffers can be used. Potassium borate is especially useful for maintaining an alkaline pH.

The reaction can be carried out in a slurry of magnesium hydroxide to maintain a pH of about 10.

Barium hydroxide is a convenient base for pH control since the barium ion can be readily removed from the reaction mixture by precipitation with an acid such as sulfuric acid. An advantage of this procedure is that a large proportion of the inorganic salts are removed so that they do not accumulate over the course of several successive steps and thereby complicate the purification of the final product.

External addition of a base, suitably sodium or potassium hydroxide can be used to maintain close control during the course of a reaction, for example when the change of pH is being followed with a pH meter. Often such addition will be used in conjunction with a buffer.

When operating under the conditions described above, polypeptides of predetermined structure can be prepared by successive reactions of an amino acid, peptide or derivative thereof with the selected N-carboxy anhydride, decarboxylating the resulting N-carboxy compound if necessary and repeating the reaction without isolation of the products formed as many times as is necessary in the original reaction medium until the polypeptide product having the desired chain length is obtained. It is also convenient to react an N-carboxy anhydride of one peptide with another peptide to obtain high molecular weight polypeptides of accurately known structure.

Normally, the polypeptide, since it is amphoteric, will be soluble under acidic and basic conditions. Occasionally, however, the structure of the formed product is such that it will precipitate under the conditions of the reaction or on subsequent pH adjustment. In such event it is often good practice to isolate the product by filtration and perform subsequent reactions in fresh aqueous media. Often peptides containing a high proportion of amino acids with aromatic groups such as phenylalanine or tryosine will precipitate from acid solution following decarboxylation. In some instances carbamate salts of polypeptides are insoluble in the basic media in which they are formed and precipitate. These salts can be separated by filtration and decarboxylated in fresh aqueous acid before subsequent reaction with another anhydride.

As has been previously emphasized, the process of this reactions produces the desired products of excellent purity in high yield with a minimum accumulation of side products. Such side products as are produced are generally sufficiently different in chemical and physical properties so as not to interfere substantially with successive reactions. It is, however, good practice to separate desired intermediates from time to time. For example after ten or fifteen reactions. Often the structure of the peptide prepared is such that it may be very conveniently separated from accumulated by-products. For example, a peptide containing arginine or other basic amino acid in the peptide can be readily purified by contact with a cationic ion exchange resin, for example a carboxylic resin such as Amberlite IRC 50 on the acid cycle at a pH at which the peptide and by-products are selectively adsorbed and eluted. The eluate containing the peptide may be used as the reaction medium for subsequent reaction with another anhydride. Analogous procedures can be employed with peptides containing dicarboxylic amino acids.

The final products and intermediates prepared by the process of the invention can be isolated in any convenient manner, for example by crystallization; salting out, for example with ammonium sulphate or by adjusting the pH to the point where the product precipitates. Chromatographic separation using silica gel, ion exchange resins, or molecular sieve chromatographic agents such as crosslinked dextrans available in a variety of forms under the tradename Sephadex from A. B. Pharacia of Uppsala, Sweden. One very convenient procedure is to prepare the final product with an easily removed 'handle,' e.g. a strongly basic group which will readily react with an ion exchange resin or other reagent to separate the desired product from the by-products not containing arginine. The 'handle' is then removed. For example, if the desired product is a hexapeptide, it is convenient to prepare a heptapeptide with arginine as a carboxy terminal amino acid. The arginine is strongly basic and, as a result, the heptapeptide is readily absorbed on a cationic ion exchange resin so as to effect separation from the by-products. The heptapeptide is then eluted and subjected to the action of the enzyme carboxypeptidase-B which selectively removes the arginine leaving the desired hexapeptide.

The arginine 'handle' is also useful in the preparation of polypeptides in which an excess of N-carboxy anhydrides is used in the course of its preparation. If in an earlier step in the reaction the N-carboxy anhydride of arginine was added to the polypeptide chain or if arginine is the carboxy terminal amino acid, the resulting arginine containing polypeptide product will have physical and chemical properties which permit ready separation from any of the undesirable by-products, particularly those resulting from the use of excess anhydride in one or more of the steps. The product may be separated as described above and, if desired, a carboxy terminal arginine may be removed with carboxypeptidase-B.

A procedure which is especially useful for the isolation of products is a capillary flow chromatographic technique. The process is similar to thin layer chromatography on a large scale. An effort is made to reproduce the conditions of thin layer chromatography as closely as possible, only with larger quantities of reagents. The same ratio of absorbent to amino acid or peptide is maintained.

In the process a column is packed with silica gel, cellulose or other suitable adsorbent. A solution containing the peptide is contacted with the lower portion of the column and allowed to develop. It has been observed that $R_f$ values of the components of the reaction mixture substantially parallel the $R_f$ values for the same components as determined by thin layer chromatography. The appropriate portion of the column containing the desired product, as previously ascertained by thin layer methods, is then simply cut out and eluted. As an alternative the surface of the column can be sprayed with ninhydrin or some other reagent which will effect a color change to locate the product. The column is then sectioned, the colored surface layer is scraped away and the product eluted from the remaining portion of the section.

The process of this invention is applicable to amino acids and peptides, both natural and synthetic in both the dextro and levo form. It may be used with compounds having functional groups other than the amino and carboxyl groups of the desired peptide bond such as tyrosine, arginine, threonine, glutamic acid and the like. It is applicable also to derivatives in which these additional functional groups are blocked with a group which is readily removed subsequent to peptide formation, such for example as the N-carboxy anhydrides of im-benzyl histidine, triflouro acetyl serine or tetrahydropyranyl-tyrosine. The term "derivatives" as used herein also includes within its scope amides, esters, and other functional modifications of the carboxylic group of the amino acid or peptide and homologs of analogs of natural amino acids in which one or more hydrogen atoms is substituted, for example with a lower alkyl group such as α-methylleucine or α-fluoro glycine. These latter compounds are especially useful in analyzing structure-activity relationships in physiologically active proteins such as hormones, and in preparing antagonists for such active proteins for various thereapeutic applications. The process of the invention may be used to prepare physiologically active derivatives of primary and secondary amines, thioalcohols and compounds obtained from phosphorus containing acids such as phosphate esters.

Because of their structure certain of the amino acids require special consideration in the process of this invention.

The imidazole nitrogen of the N-carboxy anhydride of histidine may be protected prior to reaction by the formation of an im-benzyl derivative which can be removed from the peptide by hydrogenation or by the action of sodium in liquid ammonia. The imidazole group of this amino acid does not appear to interfere with subsequent reactions with anhydrides once the peptide is formed.

The hydroxyl group in serine and in threonine anhydrides is conveniently blocked by forming trifluoro acetyl or trichloroacetyl derivatives of the respective N-carboxy anhydrides. These groups are especially suitable since they are hydrolytically removed during the formation of the peptide. Hydroxy groups can be protected by the formation of ethers, for example, benzyl ether; tetrahydropyranyl ether or other acetal or ketal.

It is a feature of this invention that unexpectedly the anhydrides of aspartic and glutamic acids may be utilized without protecting their thermal carboxyl groups.

Cystine which is a dithio amino acid with symmetrical α-amino carboxylic acid moieties on either side of the disulfide linkage is utilizable in this invention in a unique manner to produce two identical polypeptides each containing cysteine, an amino acid containing a sulfhydryl group. In the process a symmetrical di-N-carboxy anhydride of cystine is reacted with a starting amino acid, peptide or derivative to produce a symmetrical product with at least one peptide bond on each side of the disulfide linkage. For example the dianhydride of cystine may be reacted with alanine to produce cystylbisalanine. Thereafter the chain grown is continued as described above, for example, by stepwise reactions with the anhydrides of leucine and valine to produce di-leucylalanyl (cystylbisalanine). When a polypeptide having the desired molecular structure has been prepared the compound is reduced, for example, with hydrogen sulfide, thioglycollic acid or equivalent reducing agent to split the disulfide link thereby forming two identical molecules of the desired polypeptides each containing cysteine.

The novel process of this invention is readily adaptable to the preparation of a series of analogs of long chain proteins such as enzymes or hormones in which one amino acid in the middle of the chain is varied. For example, if the 10th amino acid of a polypeptide containing 20 amino acid is to be varied to prepare analogs in which all of the other amino acids are retained in the same sequence, it is convenient to first prepare a series of peptides containing 9 amino acids and a second series containing 10 amino acids. The members of the first series will be converted to various decapeptides by reaction with N-carboxy amino acid anhydrides of a variety of amino acids. Each of the thus produced decapeptides can be coupled with decapeptides from the second series to produce polypeptides containing 20 amino acids in which the only variable is one amino acid in the middle of the chain. Such coupling can be effected by conventional coupling procedures such as the carbobenzoxy method.

An additional and most important advantage of this invention is that the process can be carried out with substantially complete control of racemization. The importance of this factor will be apparent from the above discussion of the repidly decreasing probability of obtaining optically pure products when optically impure materials are used or generated in the production of peptides, even those of relatively low molecular weight. The optical purity of the products of this invention can be readily determined, for example by subjecting them to the hydrolytic action of specific enzyme such as leucine aminopeptidase which will attack only one optical isomer.

The following examples are given by way of illustration only and should not be considered limitations of this invention. Unless otherwise indicated all optically active amino acids are used in their 1-form.

EXAMPLE 1

Valyl-alanyl-alanyl-prolyl-phenylalanyl-arginine

A mixture of 420 mg (2m moles) of arginine hydrochloride in 20 ml. of 1 molar aqueous potassium borate buffer containing 5 g. of ice at pH 11 is cooled to about 0°C. and 386 mg. (2.01 m mole) of solid N-carboxy phenylalanine anhydride added with rapid stirring. The mixture is blended for one minute and the pH adjusted to 3 with concentrated sulfuric acid at 0°C. while nitrogen is bubbled through for about 10 minutes. The product phenylalanylarginine is not isolated.

The pH of the mixture is adjusted to 9.5 by the addition of concentrated potassium hydroxide and cooled to 0°C. Five grams of ice is added followed by 285 mg. (2.02 m moles) of N-carboxy proline anhydride and the mixture blended for three minutes. Decarboxylation is effected as described above and the product is not isolated.

The foregoing process is repeated at pH 10 with addition of 235 mg. (2.04 m moles) of N-carboxy alanine anhydride with blending for one minute. The product alanyl-prolyl-phenylalanyl-arginine which is obtained by decarboxylation as described above is not isolated.

The same procedure is repeated at pH 10 with stirring for one minute utilizing 235 mg. (2 m moles) of N-carboxy alanine anhydride to produce alanyl-alanyl-prolyl-phenylalanyl-arginine which is not isolated.

Repetition of the process at pH 10 with 294 mg. (2.05 m moles) of N-carboxy valine anhydride affords valyl-alanyl-alanyl-prolyl-phenylalanyl-arginine.

The pH of the resulting solution (46 ml.) is adjusted with aqueous sodium hydroxide to pH 7.5 and charged to a 30 ml. column of IRC 50 resin on the acid cycle contained in a 1.5 cm. inside diameter column at a charge rate of 1.0 ml./min. The column is washed with 200 ml. water at a charge rate of 2 ml./min/ and eluted with 75 ml. of 0.25 N sulfuric acid followed by 75 ml. of 1.0 N sulfuric acid. The eluate containing arginine containing peptide is collected in 25 ml. cuts at a rate of 1 ml./min.

Samples of all fractions are spotted for circular paper strip chromatography in the system secondary butanol/water/acetic acid, 6/3/1. With a solvent front at about 6 cm., eluate fractions 3,4,5 and 6 showed strong ninhydrin positive bands at a $R_f$ of 0.39 indicative of the desired hexapeptide. (The $R_f$ values of the product and the reactants were previously determined by thin layer chromatography). These fractions were combined, concentrated in vacuo, the pH adjusted to 7.5 with aqueous sodium hydroxide solution and freeze dried. The freeze-dried solid is extracted with four 10 ml. fractions of methanol and the methanol removed in vacuo. The residue is dissolved in 6 ml. of water and the pH adjusted to 3.0 with aqueous sulfuric acid and the product precipitated by the addition of 25 ml. of methanol followed by 55 ml. of ethanol. The suspension is refrigerated overnight and filtered to yield the desired product as established by Spinco amino acid analysis after hydrolysis.

There follows a list of amino acids which are used both in the acid form and as N-carboxy anhydrides in the process of this invention to produce a wide variety of polypeptides. Each of the amino acids is assigned an abbreviation and in the list which follows the products which are prepared by the process of the invention are identified by these abbreviations. In the second list, the first product which is identified as GLY-ALA-LEU-ILEU-VAL-PHE is glycyl-alanyl-leucyl-isoleucyl-valyl-phenylalanine. It is prepared, as are each of the succeeding products, by the procedure illustrated above. The optimum conditions with respect to concentration of the reagents, PH, temperature, and time are determined by probe reactions in which small aliquots of the reagents are reacted before effecting fullscale reaction. The reactions are carried out at pH values of from 4 to 11, generally utilizing an excess of the anhydride at temperatures of from −5° to 5°C. in a blender. The temperature is maintained by either internal or external cooling, or both.

The anhydrides of the following acids are utilized as trifluoro acetyl derivatives:
Serine
Threonine
β-Hydroxy leucine
γ-Hydroxy norvaline The anhydrides of the following acids are used as S-benzyl derivatives:
Cysteine
β-Thiol norvaline
Penicillamine The N-carboxy anhydride of tyrosine is employed in the form of its tetrahydro derivative.

The omega amino groups on lysine and ornithine blocked with a carbobenzyloxy group which is removed from the final product by hydrogenation. Other blocking groups are also removed at the end of the reaction.

| | |
|---|---|
| 1. Glycine - GLY | 25. α-Amino sebacic - α,SE |
| 2. Alanine - ALA | 26. β-Methyl aspartic - βM,ASP |
| 3. Leucine - LEU | 27. β-Methyl glutamic - βM,GLU |
| 4. Isoleucine - ILEU | 28. β, β-Dimethyl asparatic - βM, βM,ASP |
| 5. Valine - VAL | 29. Ornithine - ORN |
| 6. Phenylalanine -PHE | 30. α-Amino isobutyric - α, IBU |
| 7. Tyrosine - TYR | 31. α-Amino diethyl acetic - ADA |
| 8. Tryptophane - TRY | 32. α-Amino diisopropyl acetic - α, ADIA |
| 9. Arginine - AGN | |
| 10. Lysine - LYS | 33. α-Amino ethyl isopropyl acetic - α,AEIA |
| 11. Histidine - HIS | 34. β-Hydroxy norvaline βOH, NVAL |
| 12. Serine - SER | 35. Penicillamine - PENM |
| 13. Threonine - THR | 36. β-Thio norvaline β, Th, VAL |
| 14. Proline - PRO | |
| 15. Cysteine - CYS | 37. α-Amino phenylacetic α, APA |
| 16. Cystine - CYST | 38. O-Chloro phenylalanine - O-Cl-PHE |
| 17. Methionine - MET | 39. Furfurylalanine - FALA |
| 18. Aspartic acid - ASP | 40. Thienylalanine - THALA |
| 19. Glutamic acid - GLU | 41. α-Naphthylalanine - α, NALA |
| 20. Asparagine - ASN | 42. 3-Thionaphthenylalanine - TNALA |
| 21. Glutamine - GLN | 43. 3-Coumaronylalanine - COU,ALA |
| 22. α-Amino adipic - α,AD | 44. N-methyl glycine - NM,GLY |
| 23. α-Amino pimelic- α,PI | 45. N-methyl alanine - NM,ALA |
| 24. α-Amino suberic - α, SU | 46. N-Methyl leucine - NM,LEU |
| | 47. N-methyl tyrosine - NM,TYR |

In accordance with the procedure hereinabove, there are obtained the following hexapeptides: GLY-ALA-ILEU-VAL-PHE-TYR; TRY-AGN-LYS-HIS-SER-THR; PRO-CYST-MET-ASP-GLU-ASN; GLN-α, αAD-α, PI-α, SU-α, SE-βM,ASP; βM, GLU-βM,ASP-ORN-α-IBU-ADA-α, ADIA; α-AEIA-βOH,NVAL-PENM-βTh,VAL-α, APA-O-Cl-PHE; F-ALA-THALA-α,NALA-TNALA-COU,ALA-NM,GLY; NM, ALA-NM, LEU-NM,TYR-GLY-ALA-LEU; di-LEU-VAL (CYS-bis ALA); SER-GLU-FALA-NM,ALA-ASN-GLN; and THR-MET-ORN-SER-α, PI-ASP.

EXAMPLE 2

Aspartyl-glycyl-glycyl-leucine

A mixture of 2 m moles of leucine in 20 ml. of aqueous potassium borate buffer at pH 10 is cooled to −5°C. and 2.05 m moles of solid N-carboxy glycine anhydride added with rapid stirring. Reaction is continued for 50 seconds and the pH adjusted to 5 with concentrated sulfuric acid at 0°C. while passing a stream of nitrogen through the mixture for about 10 minutes.

The process is repeated at pH 10 without isolating the intermediate glycyl leucine produced using 2.02 m moles of N-carboxy glycine anhydride to produce glycyl-glycylleucine which is not isolated.

The pH of the mixture is adjusted to 8.5 by the addition of concentrated potassium hydroxide and 2.1 m moles of N-carboxy aspartic anhydride is added at 0°C. with rapid stirring. After 30 seconds the pH of the mixture is adjusted to 4 while a stream of nitrogen is passed through the mixture. The desired tetrapeptide forms and is isolated by salting out with ammonium sulfate.

By replacing the N-carboxy aspartic acid anhydride with the appropriate anhydride and repeating the foregoing procedure, the following compounds are prepared:
glutamyl-glycyl-glycyl-leucine
glutaminyl-glycyl-glycyl-leucine
asparaginyl-glycyl-glycyl-leucine

EXAMPLE 3

Tyrosyl-leucyl-phenylalanine

A mixture of 3 m moles of phenylalanine in 30 ml. of aqueous potassium borate buffer containing 5 g. of ice at pH 10.5 is cooled to 3°C. and 3.2 m moles of solid N-carboxy leucine anhydride added with rapid stirring. Reaction is continued for 30 seconds and the pH adjusted to 3 with concentrated sulfuric acid at 0°C. while passing a stream of nitrogen through the mixture. The product leucyl-phenylalanine is not isolated.

The pH of the mixture is adjusted to 10.0 by the addition of concentrated potassium hydroxide and 3.4 m moles of tetrahydropyranyl-tyrosine-N-carboxy anhydride added with rapid stirring while maintaining the temperature at approximately 0°C. Reaction is continued for one minute and the decarboxylation effected by adjusting the pH to 3 with sulfuric acid. The mixture is allowed to come to room temperature and held for one hour to remove the protecting group. The desired product is isolated chromatographically on a silica gel column.

The same compound is prepared by repeating the above procedure utilizing ethoxyethyltyrosine-N-carboxy anhydride.

EXAMPLE 4

Valyl-leucyl-alanyl-cysteine

A mixture of 2 m moles of cystine in 30 ml. of aqueous potassium borate buffer at pH 10 is maintained at about 10°C. while 4.1 m moles of N-carboxy alanine anhydride is added with rapid stirring. Reaction is continued for 2 minutes and the pH adjusted to 3 with dilute hydrochloric acid at 2°C. while a stream of nitrogen is passed through the mixture. The resulting product cystyl-bis-alanine is not isolated.

The pH of the mixture is adjusted to 10.2. It is cooled to 0°C. and 4.2 m moles of N-carboxy leucine anhydride added with rapid stirring. Reaction is continued for one minute and decarboxylation effected by adjusting the pH to 3.5 while passing a stream of nitrogen through the mixture. The intermediate di-leucyl(cystyl-bis-alanine) is not isolated, but is treated with 4.3 m moles of N-carboxy valine anhydride at 0°C. with rapid stirring and decarboxylated with sulfuric acid at pH 3 to afford di-valyl-leucyl(cystyl-bis-alanine) which is salted out of the reaction mixture.

The product is reduced with hydrogen sulfide to afford valyl-leucyl-alanyl-cysteine.

EXAMPLE 5

Lysyl-glycyl-glycyl-leucine acetate

Glycyl-glycyl-leucine is prepared in accordance with the procedure of Example 2 and the reaction mixture containing it is treated with 2.5 m moles of solid omegacarbobenzoxy-N-carboxy lysine anhydride at 0°C. with rapid stirring for a period of 40 seconds. Decarboxylation is effected with sulfuric acid in the presence of nitrogen at pH 4. The product N-carbobenzoxylsyl-glycyl-glycyl-leucine is salted-out of the mixture and recovered by filtration.

The carbobenzoxy group is removed by hydrogenation at atmospheric pressure and room temperature with an equal weight of 10% Pd/C in acetic acid solution, and the product isolated by removal of the solvent in vacuum after filtration of the catalyst.

EXAMPLE 6

Glycyl-phenylalanyl-leucine

To a mixture of 4.0 moles of leucine in 20 ml. of water of 0°C. there is added 3.1 m moles of N-carboxy phenylalanyl anhydride while maintaining the pH at 10.5 by intermittent addition of barium hydroxide powder. The reaction is complete in one minute. The pH is adjusted to 3.5 by the addition of ten per cent sulfuric acid. The barium sulfate which precipitates is removed by filtration and the filtrate containing phenylalanyl leucine treated with 3.2 m moles of N-carboxy glycine anhydride at −3°C. and a pH of 10.5 maintained using barium hydroxide. Decarboxylation is effected by adjusting the pH to 3.5 with concentrated sulfuric acid and the desired product isolated by freeze-drying.

The same product is obtained if the reaction is carried out while adding dilute aqueous sodium hydroxide in place of the solid barium hydroxide. Of course, no barium sulfate is formed so that the filtration step may be omitted. The product is recovered by first passing the reaction mixture over a carbon column. The peptide is adsorbed and then eluted with acetic acid-water. It is recovered from the eluate by freeze-drying.

EXAMPLE 7

N-methyl-leucyl-glycyl-glycyl-glycyl-glycyl-isoleucine

A mixture containing 4 m moles of glycyl-glycyl-glycyl-glycyl-isoleucine in 30 ml. of aqueous potassium borate buffer at pH 9.5 is cooled to about 0°C. and 4.3 m moles of N-methyl leucine N-carboxy anhydride added with rapid stirring. The mixture is stirred rapidly for 30 seconds and the pH adjusted with concentrated sulfuric acid to 3.1 to effect decarboxylation in the presence of nitrogen. The desired product is isolated by passing the solution over a carboxylic resin and subsequently eluting with ammonium hydroxide solution.

EXAMPLE 8

Leucyl-valyl-alanyl-alanyl-prolyl-phenylalanyl-arginine

Example 1 is repeated and fractions 3, 4, 5 and 6 obtained from the chromatographic column containing valyl-alanyl-alanyl-prolyl-phenylalanyl-arginine combined and concentrated to a volume of 20 ml. This mixture is cooled to 0°C. and 1.5 m moles of N-carboxy leucine anhydride added while maintaining the pH at 10.5 by automatic titration with dilute potassium hydroxide. Reaction is complete in 90 seconds and decarboxylation is effected in the usual way with concentrated sulfuric acid. The heptapeptide product is isolated.

The identical product is obtained by isolation and purification of the valyl-alanyl-alanyl-prolyl-phenylalanylarginine and subsequent reaction with 1.5 m moles of N-carboxy leucine anhydride in potassium borate buffer at pH 10.5 at 0°C. during a period of one minute followed by decarxobylation by adjusting the pH to 3.3 with concentrated sulfuric acid. It is isolated chromatographically using the procedure of Example 1.

EXAMPLE 9

Leucyl-alanyl-glycyl-prolyl-phenylalanyl-arginine

A total of 3.48 grams of arginine is taken up in 200 ml. of 1 molar potassium borate buffer. The pH is adjusted to 3 with sulfuric acid and swept with nitrogen to insure removal of carbon dioxide. The pH is then adjusted to 11 with dilute aqueous potassium hydroxide, the mixture cooled to 0°C. and 3.84 grams of solid N-carboxy-phenylalanyl anhydride added with high speed stirring. (Two drops of capryl alcohol is added to the mixture to inhibit foaming during the reaction.) At the end of one minute the pH of the reaction mixture is 10.9. The intermediate N-carboxy-phenylalanyl-arginine is decarboxylated by adjusting the pH to 3 with sulfuric acid to produce phenylalanyl-arginine which is not isolated.

The following table summarizes the reaction conditions under which subsequent reactions were carried out to produce the final product. The various amino acids and peptides are identified by the same abbreviations used in Example 1.

| NCA | Initial pH | Temp. | Time | Final pH | −CO$_2$ pH | Product |
|---|---|---|---|---|---|---|
| PRO 2.82 g. | 9.5 | 0°C | 1 | 8.9 | 3 | PRO-PHE-AGN |
| GLY 2.2 g. | 11 | 0°C | 1 | 10.4 | 3 | GLY-PRO-PHE-AGN |
| ALA 2.30 | 10 | 0°C | 1 | 9.6 | 3 | ALA-GLY-PRO-PHE-AGN |
| LEU 3.14 | 10 | 0°C | 1 | 9.8 | 7 | LEU-ALA-GLY-PRO-AGN |

The optimum pH in each instance is determined by probe reactions.

The pH of the final mixture is adjusted to 7 and the mixture filtered to give a clear solution from which the desired product is isolated. In this last step decarboxylation takes place at pH 7 on standing.

A total of 335 ml. of the clear solution thus obtained is diluted with water to a volume of 1,340 ml. The pH of the resulting solution is 7.3. It is charged to a 400 ml. column of IRC 50 resin in the acid cycle contained in a 3.3 cm. inside diameter column at a charge rate of 15 ml./min. The column is washed with 2,800 ml. of water at a charge rate of 20-25 ml./min. The resin is then eluted with 0.5N sulfuric acid at a charge rate of 15 ml./min. The eluate is collected in 250 ml. fractions.

Fractions 3, 4, 5 and fractions 6 and 7 are combined to give two composites. Each composite is adjusted to pH 7.5 with sodium hydroxide solution and freeze dried. Each freeze dried solid is extracted with 4×100 ml. of methanol and the methanol removed in vacuo. The residues are dissolved in water and again freeze dried. The combined residues are dissolved in 50 ml. of water, the pH adjusted to 3.4 with sulfuric acid and the sulfate salt of the hexapeptide precipitated with one liter of ethanol.

The product is converted to the free peptide by dissolving the salt in water, adding sufficient barium hydroxide to precipitate all of the sulfate as barium sulfate, filtering and freeze drying the filtrate.

A sample of the product is hydrolyzed and the hydrolysis mixture analyzed with the following results:

| Amino Acid | Micrograms/mg | AMINO ACID RADIO Found | Theory |
| --- | --- | --- | --- |
| ARG | 1.13 | 0.98 | 1 |
| PHE | 0.99 | 1.01 | 1 |
| PRO | 1.19 | 0.95 | 1 |
| GLY | 1.03 | 1.10 | 1 |
| ALA | 1.09 | 0.92 | 1 |
| LEU | 1.06 | 1.05 | 1 |

EXAMPLE 10

Leucyl-alanyl-glycyl-prolyl-phenylalanyl-arginine

The procedure of the previous example is repeated on a somewhat larger scale to prepare N-carboxy prolyl-phenylalanyl-arginine which is decarboxylated at pH 3. Approximately 900 ml. of the resulting solution is adjusted to pH 7 with sulfuric acid and diluted to 10 liters with water. The solution is passed over a 3 liter column of IRC 50 on the acid cycle and washed with 17.5 liters of water. The column is eluted with 7 liters of 0.5 N sulfuric acid and separated into a 4 liter and a 3 liter fraction. The 4 liter fraction is adjusted to pH 7 with aqueous sodium hyroxide, freeze dried and the residue extracted with 15 liters of anhydrous methanol. The solution is concentrated to dryness in vacuo and the residue dissolved in water. The tripeptide is precipitated as the sulfate salt by adjusting the pH to 5 with sulfuric acid, adding an equal volume of methanol and a double volume of ethanol and cooling.

This example illustrates the aspects of this invention when, because of the ease of isolation, an intermediate tripeptide is isolated in the course of the preparation of a higher peptide.

The following table describes the procedure by which 1.808 g. of prolyl-phenylalanyl-arginine sulfate is converted to the desired hexapeptide.

| NCA | Wt. | Initial pH | Temp. | Time | Final pH | $-CO_2$ pH | Product |
| --- | --- | --- | --- | --- | --- | --- | --- |
| GLY | 399mg | 10 | 0°C. | 1 | 9.6 | 3 | GLY-PRO-PHE-ARG |
| ALA | 460mg | 10 | 0°C. | 1 | 9.5 | 3 | ALA-GLY-PRO-PHE ARG |
| LEU | 634mg | 10 | 0°C. | 1 | 9.6 | 3 | LEU-ALA-GLY-PRO PHE-ARG |

The final product is isolated chromatographically.

EXAMPLE 11

Glycyl-prolyl-phenylalanyl-arginine

A total of 4.21 g. of arginine hydrochloride is taken up in 200 cc. of potassium borate buffer, the pH reduced to 3.0 while bubbling nitrogen through the mixture to expel carbon dioxide and then adjusted to 11.0 by the addition of aqueous potassium hydroxide. The mixture is cooled to 0°C. and 25 g. of ice added followed by 3.82 g. of N-carboxy phenylalanine anhydride. The mixture is stirred rapidly in a blender for one minute. The final pH is 10.7 and this is adjusted to pH 3 with sulfuric acid to effect decarboxylation.

The pH is then increased to 10 by the addition of potassium hydroxide and the procedure repeated with 2.82 g. of N-carboxy proline anhydride. The final pH is 9.85 and this is adjusted to 3.0 for decarboxylation.

The procedure is repeated with 2.22 g. of N-carboxy glycine anhydride at an initial pH of 9.5. The final pH is 9.1. It is adjusted to 7 with sulfuric acid and allowed to stand for approximately 16 hours to effect decarboxylation.

The reaction mixture is diluted 10 fold to a total of 10 liters and passed over a 800 ml. IRC-50 column during a period of 18 hours. The column is washed with 4 liters of water at a flow rate of 15 ml./min. The column is eluted with 0.35 N sulfuric acid and the eluate collected in 300 ml. fractions. The fractions giving a positive ninhydrin test are freeze dried, the solids content combined, and extracted with methanol until the extracts fail to give a ninhydrin test. The extracts which give a positive ninhydrin test are combined and evaporated to dryness in vacuo. The residue is taken up in the minimum amount of dilute sulfuric acid at pH 4.5 and precipitates by the addition of 5 volumes of methanol followed by 10 volumes of ethanol. The precipitate is recovered by filtration, dissolved in water and again precipitated with the same amounts of methanol and ethanol. The precipitated product glycyl-prolyl-phenylalanyl-arginine is isolated and washed with methanol and ether.

EXAMPLE 12

Cysteinyl-glycyl-glycyl-glycine

A total of 19 m moles of glycine is taken up in 200 ml. of potassium borate buffer at pH 11, cooled to 0°C.

and 19 m moles of N-carboxy glycine anhydried added.

The mixture is stirred rapidly for 1 minute and the pH adjusted to 3 to decarboxylate. The pH is then increased to 11 with potassium hydroxide and the process repeated with 19.5 m moles of N-carboxy glycine anhydride.

To the solution containing glycyl-glycyl-gylcine at pH 11 there is added 22 m moles of S-benzyl N-carboxy cysteine anhydride and 50 g. of ice, and the mixture is stirred for one minute. The final pH is 10.2. It is adjusted to 5.5 with sulfuric acid and the mixture passed over a 100 ml. carbon column. The column is washed with 200 ml. of water and then the 800 ml. of 5 percent acetic acid. Elution is effected with 5 percent acetic acid in 50 percent acetone. The eluate is evaporated in vacuo to leave the desired product as a residue. It is recrystallized from acetone - water.

EXAMPLE 13

Alanyl-alanyl-alanyl-alanyl-glycine

To a solution of 80 m moles of glycine in 4 liters of sodium borate buffer at pH 10 at 0°C. there is added 80 m moles of N-carboxy alanine anhydride with rapid stirring. After 2 minutes the pH is lowered to 3 to effect decarboxylation while passing a stream of nitrogen through the mixture. The pH is increased to 10 with 50 percent aqueous sodium hydroxide and the above reaction repeated. The procedure is repeated twice again. Upon final decarboxylation at pH 3 a precipitate forms which is crystallized by dissolving in aqueous sodium hydroxide at pH 11 and lowering the pH to 5.5. The identity of the compound is established by elemental analysis and by Spinco amino acid hydrolysis.

EXAMPLE 14

SYNTHESIS OF A AND B CHAIN OF HUMAN INSULIN

Outline of Synthetic Approach

The reaction conditions employed in the various reaction steps are as follows:

I

One molar potassium borate buffer — adjust to coupling pH with potassium hydroxide or sulfuric acid — high speed blender — external cooling with brine to maintain internal temperature at 0°-2°C — add solid amino acid anhydride over 30 second interval while maintaining pH as close as possible to ± 0.1 pH units of protecting pH with cold aqueous potassium hydroxide — adjust to decarboxylation pH with concentrated sulfuric acid — sweeping with nitrogen for 15 minutes — readjust pH to protecting pH.

II

Aqueous solution — adjust to coupling pH with one molar barium hydroxide (prepared by dissolving barium hydroxide in water at 35°C) — high speed blender — external cooling with brine to maintain internal temperature at 0°-2°C — add solid amino acid anhydride over 30 second interval while maintaining pH as close as possible to ± 0.1 pH units of protecting pH with cold aqueous barium hydroxide — adjust to decarboxylation pH with concentrated sulfuric acid — sweep with nitrogen for 15 minutes — filter to remove precipitated barium sulfate — readjust pH to protecting pH.

III

Slurry with 0.5 molar magnesium hydroxide at pH 10 as buffer — high speed blender — external cooling with brine to maintain internal temperature at 0°-2°C — add solid amino acid anhydride over 30 second interval — filter and adjust to decarboxylation pH with concentrated sulfuric — sweep with nitrogen for 15 minutes — filter to remove precipitated magnesium sulfate — readjust pH to protecting pH.

In the tables given below certain of the polyfunc-

EXAMPLE 14.—SYNTHESIS OF A AND B CHAIN OF HUMAN INSULIN

Outline of Synthetic Approach

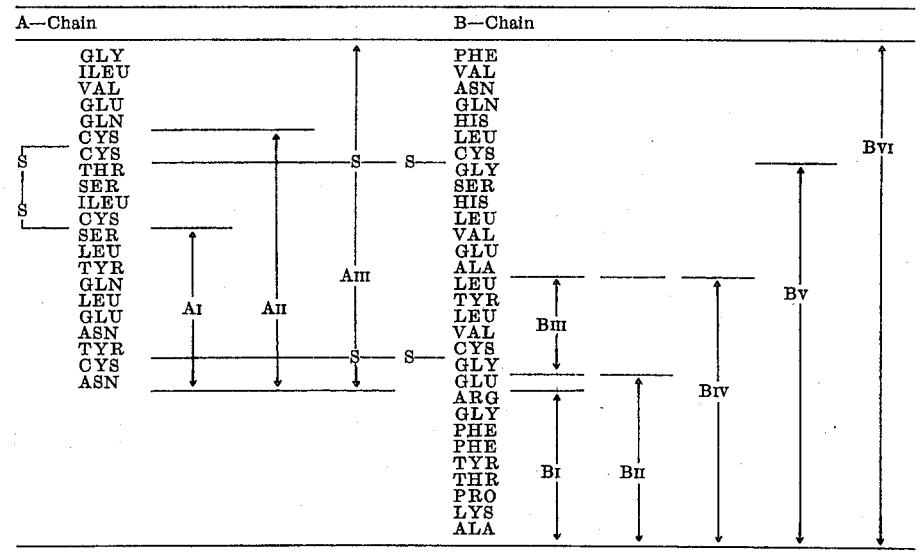

The above synthetic outline summarizes the steps employed in the synthesis of the A and B Chain of human insulin.

tional amino acids are noted with an asterisk to indicate that the additional functional groups are blocked as follows:

| | |
|---|---|
| CYS | S-benzyl |
| TYR | O-tetrahydropyranyl ether |
| SER | Trifluoroacetyl |
| THR | O-tetrahydropyranyl ether |
| LYS | ε-carbobenzoxy |
| HIST | im-benzyl |

The trifluoroacetyl group which protects the hydroxyl group of the serine is removed under the coupling conditions. The resulting free hydroxyl group does not interfere with subsequent additions of amino acid anhydride. The tetrahydropyranyl group is stable under coupling conditions, but is hydrolytically removed under acid conditions. The free hydroxyl group thus generated may be partially converted to an ester in the next reaction step by reaction with excess NCA, and the thus formed product decarboxylated in the usual manner. The ester is then selectively saponified without affecting the peptide bonds with aqueous alkali at room temperature. This may be effected by simply adding dilute sodium hydroxide to the mixture and allowing it to stand at room temperature until the change in the ultraviolet spectra indicates that reaction is complete. The aromatic hydroxyl group does not interfere with subsequent reactions.

In this example and in the next example, this procedure is used whenever the tetrahydropyranyl ether of N-carboxy tyrosine anhydride is employed.

Other protecting groups are removed by conventional procedures.

At each step of the synthesis probe reactions are conducted in the manner described above to determine the optimum reaction conditions.

The first step of the synthesis is the preparation of the $A_1$ fragment of the A-chain. Reaction is initiated by treatment of ASN with the N-carboxy anhydride of S-benzyl CYS and continued by the sequential addition of TYR, ASN, GLU, LEU, GLN, TYR, LEU and SER. The table below describes the reaction sequence. In this table and subsequent tables the per cent molar excess is based on the amount of starting material employed.

TABLE I

PREPARATION OF PEPTIDE $A_1$

| Step Number | Reac. Cond. | NCA Used | % Excess Employed | Coupling pH | Time In Min | Decarb. pH |
|---|---|---|---|---|---|---|
| 1 | I | CYS* | 5 | 10.6 | 2 | 6 |
| 2 | I | TYR* | 5 | 10.2 | 5 | 3 |
| 3 | I | ASN | 20 | 10.3 | 2 | 3 |
| 4 | I | GLU | 10 | 9.8 | 1 | 3 |
| 5 | I | LEU | 10 | 10.2 | 1 | 5 |
| 6 | I | GLN | 15 | 10.4 | 2 | 5 |
| 7 | I | TYR* | 30 | 9.9 | 5 | 3 |
| 8 | I | LEU | 15 | 10.3 | 1 | 3 |
| 9 | I | SER* | 40 | 9.8 | 5 | 3 |

At the end of the reaction sequence the reaction mixture is clarified by filtration and the product isolated by capillary chromatography on silical gel by first running in 4:1:5 butanol:water:acetic acid and then re-running the product band in 7:7:6 pyridine:isoamyl alcohol:water.

The isolated product is an S- benzyl decapeptide. It is sequentially treated in accordance with the procedure shown in Table II to produce the polypeptide $A_{II}$.

TABLE II

PREPARATION OF PEPTIDE $A_{II}$

| Step Number | Reac. Cond. | NCA Used | % Excess Employed | Coupling pH | Time In Min | Decarb. pH |
|---|---|---|---|---|---|---|
| 1 | II | CYS* | 5 | 10.4 | 5 | 5 |
| 2 | II | ILEU | 6 | 10.2 | 1 | 4 |
| 3 | II | SER* | 25 | 10.0 | 2 | 3 |
| 4 | II | THR* | 20 | 10.0 | 2 | 3 |
| 5 | II | CYS* | 15 | 10.7 | 5 | 5 |
| 6 | II | CYS* | 15 | 10.5 | 5 | 5 |

The resulting product is isolated by silica gel chromatography in the same manner as polypeptide $A_I$. In the product all cysteine groups are protected by benzlation.

The isolated product is converted to peptide $A_{III}$ by the sequential addition of GLN, GLU, VAL, ILEU and GLY in accordance with the sequence outlined in Table III.

TABLE III

PREPARATION OF PEPTIDE $A_{III}$

| Step Number | Reac. Cond. | NCA Used | % Excess Employed | Coupling pH | Time In Min | Decarb. pH |
|---|---|---|---|---|---|---|
| 1 | III | GLN | 5 | 10.6 | 3 | 3 |
| 2 | III | GLU | 7 | 9.8 | 1 | 3 |
| 3 | III | VAL | 8 | 10.2 | 2 | 4 |
| 4 | III | ILEU | 10 | 10.0 | 2 | 5 |
| 5 | III | GLY | 30 | 10.2 | 1 | 3 |

The product is separated on silica gel as described above. The S- benzyl groups are removed by reduction with sodium in liquid ammonia to complete the synthesis of the A-chain fragment of human insulin.

Preparation of the B- chain is initiated by the preparation of peptide $B_I$ using the conditions outlined in Table IV which shows the sequential addition of LYS, PRO, THR, TYR, PHE, GLY and ARG to ALA.

TABLE IV

PREPARATION OF PEPTIDE $B_I$

| Step Number | Reac. Cond. | NCA Used | % Excess Employed | Coupling pH | Time In Min | Decarb. pH |
|---|---|---|---|---|---|---|
| 1 | I | LYS* | 5 | 9.8 | 2 | 3 |
| 2 | I | PRO | 6 | 10.4 | 1 | 3 |
| 3 | I | THR* | 10 | 10.2 | 2 | 5 |
| 4 | I | TYR* | 10 | 10.2 | 2 | 3 |
| 5 | I | PHE | 30 | 10.0 | 1 | 3 |
| 6 | I | PHE | 10 | 10.0 | 1 | 3 |
| 7 | I | GLY | 15 | 10.2 | 1 | 3 |
| 8 | I | ARG | 25 | 10.2 | 3 | 4 |

The resulting reaction mixture is clarified by filtration. The pH of the filtrate is adjusted to 7.5 and it is passed over a column of IRC 50 resin on the acid cycle. The product is eluted with sulfuric acid-water and the fractions containing the desired product, as determined by the ninhydrin test, combined and freeze dried. The residue is taken up in methanol, filtered, and the crude product precipitated as the sulfate salt by the addition of sulfuric acid. It is removed by filtration, air dried and taken up in water at the rate of one gram per 10 cc. of water. It is precipitated by the addition of 3 volumes of methanol followed by the slow addition of 10 volumes of methanol. The product is obtained as the sulfate.

Glutamic acid is next added to peptide $B_I$ to obtain peptide $B_{II}$. Reaction is effected under reaction conditions II using a 20 percent excess of the N-carboxy anhydride of glutamic acid at pH 10.2 during a reaction period of one minute. Sulfuric acid is utilized for decarboxylation at pH 3. The product is isolated by passing the reaction mixture over a column of IRA 400 an anionic ion exchange resin, elution with 10 percent aqueous acetic acid followed by concentration of the eluate to one-tenth volume and precipitation with isopropanol.

The preparation of $B_{III}$ illustrates the use of an arginine handle. The first peptide prepared is an octapeptide with a terminal arginine segment. This octapeptide, $B_{III}'$ is prepared by sequential addition of GLY, CYS, VAL, LEU, TYR, LEU and ALA to arginine in accordance with the procedure shown in Table V.

TABLE V

PREPARATION OF PEPTIDE $B_{III}$

| Step Number | Reac. Cond. | NCA Used | % Excess Employed | Coupling pH | Time In Min | Decarb. pH |
|---|---|---|---|---|---|---|
| 1 | I | GLY | 5 | 9.8 | 1 | 4 |
| 2 | I | CYS* | 7 | 10.2 | 2 | 3 |
| 3 | I | VAL | 8 | 10.2 | 2 | 3 |
| 4 | I | LEU | 10 | 10.0 | 2 | 3 |
| 5 | I | TYR* | 10 | 10.6 | 2 | 3 |
| 6 | I | LEU | 35 | 10.2 | 2 | 5 |
| 7 | I | ALA | 20 | 9.9 | 2 | 3 |

The product with the S- benzyl group intact is isolated by chromatography using IRC 50 resin, followed by elution with acetic acid -water, freeze drying, subsequent treatment with methanol and water, and precipitation with methanol-ethanol in accordance with the procedure described above.

The arginine 'handle' used to isolate and purify peptide $B_{III}'$ is removed using the enzyme carboxypeptidase-B to obtain peptide $B_{III}$.

Peptides $B_{II}$ and $B_{III}$ are next coupled to produce peptide $B_{IV}$. This is accomplished by first protecting $B_{III}$ by conversion to a tertiary butyl carbonyl derivative and then activating it as the nitrophenyl ester. The protect and activated product is coupled with $B_{II}$ and the protecting group hydrolytically removed with dilute aqueous acid.

At this stage of the synthesis the cystein groups are still protected with benzyl groups and the lysine segment with the carbobenzoxy group. The polypeptide is purified by capillary chromatography on silica gel with 4:1:5 butanol: acetic acid: water followed by chromatography of the product band on cellulose with 7:7:6 pyridine: isoamyl alcohol: water.

Peptide $B_{IV}$ is converted to peptide $B_V$ by sequential addition of GLU, VAL, LEU, HIS, SER, and GLY in accordance with procedures shown in Table VI.

TABLE VI

PREPARATION OF PEPTIDE $B_V$

| Step Number | Reac. Cond. | NCA Used | % Excess Employed | Coupling pH | Time In Min | Decarb. pH |
|---|---|---|---|---|---|---|
| 1 | II | GLU | 5 | 9.8 | 1 | 3 |
| 2 | II | VAL | 5 | 10.2 | 2 | 3 |
| 3 | II | LEU | 7 | 10.2 | 2 | 2 |
| 4 | II | HIS* | 15 | 10.2 | 5 | 4 |
| 5 | II | SER | 20 | 10.0 | 3 | 4 |
| 6 | II | GLY | 20 | 10.2 | 1 | 3 |

The product is isolated by capillary chromatography on silica gel using the procedure described above. In the product the cysteine groups are still protected as S-benzyl compound.

Peptide $B_{VI}$ is prepared by sequential addition of CYS, LEU, HIS, GLN, ASN, VAL and PHE to peptide $B_V$ in accordance with procedure described in Table 7 below.

TABLE VII

PREPARATION OF PEPTIDE $V_I$

| Step Number | Reac. Cond. | NCA Used | % Excess Employed | Coupling pH | Time In Min | Decarb. pH |
|---|---|---|---|---|---|---|
| 1 | I | CYS* | 5 | 10.6 | 2 | 3 |
| 2 | I | LEU | 6 | 9.8 | 2 | 3 |
| 3 | I | HIS* | 15 | 10.2 | 5 | 4 |
| 4 | I | GLN | 10 | 10.2 | 2 | 5 |
| 5 | I | ASN | 10 | 10.2 | 2 | 5 |
| 6 | I | VAL | 15 | 10.4 | 1 | 3 |
| 7 | I | PHE | 20 | 10.0 | 1 | 4 |

The protecting benzyl groups and carbobenzoxy group are removed by reduction with sodium in liquid ammonia to produce the B-chain of human insulin.

The A-chain and B-chain are combined by air oxidation using procedures heretofore described for the oxidative coupling of A and B chains isolated from natural sources. The insulin activity of the resulting product is substantially identical to that of the previously described coupled product.

EXAMPLE 15

Synthesis of Sheep α-Corticotropin

The structure of sheep α-corticotropin is shown below:

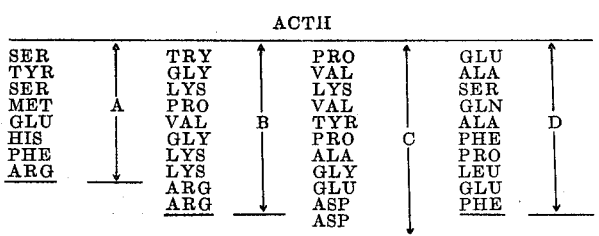

It is prepared in accordance with the procedure of the previous example utilizing the reaction conditions defined in Tables 1, 2, 3 and 4 below which show the preparation of the various segments shown above. In the first step of the synthesis the tetrahydropyranyl ether of N-carboxy tyrosine anhydride is coupled to serine under the conditions indicated in step I of Table I. The sequence is continued as indicated in the tables.

TABLE 1

Preparation of Peptide A

| Step Number | Reac. Cond. | NCA Used | % Excess Employed | Coupling pH | Time In min. | Decarb. pH |
|---|---|---|---|---|---|---|
| 1 | I | TYR* | 5 | 10.0 | 2 | 3 |

TABLE 1-Continued

Preparation of Peptide A

| Step Number | Reac. Cond. | NCA Used | % Excess Employed | Coupling pH | Time In min. | Decarb. pH |
|---|---|---|---|---|---|---|
| 2 | I | SER* | 25 | 10.2 | 2 | 3 |
| 3 | I | MET | 10 | 9.8 | 3 | 3 |
| 4 | I | HIS* | 10 | 9.8 | 3 | 4 |
| 5 | I | PHE | 10 | 10.6 | 1 | 3 |
| 6 | I | ARG | 30 | 10.2 | 2 | 3 |

The product in which the histidine is protected as the im-benzyl derivative is isolated with an IRC 50 resin as described in the previous example.

Table II shows the conditions for the conversion of peptide A into peptide A B.

TABLE 2

Preparation of Peptide AB From A

| Step Number | Reac. Cond. | NCA Used | % Excess Employed | Coupling pH | Time In Min. | Decarb. pH |
|---|---|---|---|---|---|---|
| 1 | III | TRY | 30 | 10.2 | 2 | 5 |
| 2 | III | GLY | 5 | 10.1 | 2 | 5 |
| 3 | III | LYS* | 7 | 9.9 | 2 | 5 |
| 4 | III | PRO | 10 | 10.0 | 2 | 5 |
| 5 | III | VAL | 10 | 10.2 | 3 | 3 |
| 6 | III | GLY | 10 | 10.4 | 3 | 3 |
| 7 | III | LYS* | 15 | 10.4 | 1 | 3 |
| 8 | III | LYS* | 15 | 10.4 | 1 | 3 |
| 9 | III | ARG | 20 | 9.8 | 1 | 3 |
| 10 | III | ARG | 25 | 10.0 | 1 | 3 |

Peptide A B is converted to peptide A B C in accordance with procedures defined in Table 3.

TABLE 3

Preparation of Peptide ABC From Peptide AB

| Step Number | Reac. Cond. | NCA Used | % Excess Employed | Coupling pH | Time In Min | Decarb. pH |
|---|---|---|---|---|---|---|
| 1 | I | PRO | 5 | 9.8 | 2 | 5 |
| 2 | I | VAL | 7 | 9.8 | 2 | 5 |
| 3 | I | LYS* | 10 | 10.2 | 2 | 5 |
| 4 | I | VAL* | 5 | 10.2 | 2 | 3 |
| 5 | I | TYR* | 10 | 10.2 | 2 | 3 |
| 6 | I | PRO | 20 | 10.4 | 1 | 4 |
| 7 | I | ALA | 10 | 10.2 | 1 | 3 |
| 8 | I | GLY | 10 | 10.2 | 1 | 3 |
| 9 | I | GLU | 15 | 10.4 | 1 | 3 |
| 10 | I | ASP | 15 | 10.4 | 1 | 3 |
| 11 | I | ASP | 20 | 10.6 | 1 | 3 |

This peptide is next converted to the product A B C D in accordance with the procedures shown in Table 4.

TABLE 4

Preparation of Peptide ABCD From Peptide ABC

| Step Number | Reac. Cond. | NCA Used | % Excess Employed | Coupling pH | Time In Min | Decarb. pH |
|---|---|---|---|---|---|---|
| 1 | I | GLU | 5 | 10.2 | 2 | 5 |
| 2 | I | ALA | 5 | 10.4 | 2 | 5 |
| 3 | I | SER* | 7 | 10.4 | 1 | 3 |
| 4 | I | GLN | 8 | 10.2 | 1 | 5 |
| 5 | I | ALA | 8 | 9.8 | 1 | 5 |
| 6 | I | PHE | 10 | 10.0 | 1 | 5 |
| 7 | I | PRO | 10 | 10.2 | 3 | 5 |
| 8 | I | LEU | 10 | 10.6 | 3 | 5 |

TABLE 4-Continued

Preparation of Peptide ABCD From Peptide ABC

| Step Number | Reac. Cond. | NCA Used | % Excess Employed | Coupling pH | Time In Min | Decarb. pH |
|---|---|---|---|---|---|---|
| 9 | I | GLU | 15 | 10.2 | 1 | 3 |
| 10 | I | PHE | 20 | 10.4 | 1 | 3 |

The product is isolated on IRC 50 resin utilizing the procedure of the previous example.

The carbobenzoxy and benzyl groups are removed by reduction with sodium in liquid ammonia.

EXAMPLE 16

Use of Carboxypeptidase-B

This example illustrates the procedure by which arginine is removed from a peptide using carboxypeptidase-B.

These mixtures are prepared as follows;
1. 100 cc. of tris buffer (0.1 m in sodium chloride and 0.2 m. in trihydroxymethyl amino methane) at pH 7.65,
2. 8.5 mg. of leucyl-alanyl-glycyl-prolyl-phenylalanylarginine sulfate in 3.3 cc. of the same buffer,
3. 10 cc. of enzyme mixture by diluting 0.015 cc. of a carboxypeptidase B mixture containing 10 mg. of enzyme per ml. with the same buffer.

The mixtures are mixed as follows:
2 cc. of mixture (1)
1 cc. of mixture (2)
1 cc. of mixture (3)
and incubated at 37°C for 1 hour.

The mixture is then subjected to thin layer chromatography on silica gel and two spots are observed. One is arginine. The other is the pentapeptide.

When this reaction is carried out on a preparative scale, the solutions are mixed in the same ratio and the incubation mixture freeze dried, extracted with methanol, the methanol solution concentrated to dryness, the residue taken up in water and the product isolated from the aqueous solution chromatographically on IRC 50

EXAMPLE 17

Valyl-alanyl-glycyl-prolyl-phenylalanyl-($C^{14}$) arginine

This example illustrates the preparation of a labeled peptide.

A mixture is prepared containing 0.392 mg. of uniformly labeled $C^{14}$ arginine (0.5 millicurie) in 5.0 ml. of 0.01 N hydrochloric acid and 421 mg. of non-labeled arginine in 20 ml. of 1 M potassium borate buffer at pH 10.5. A 0.2 ml. aliquot is withdrawn. To the mixture there is added 401 mg. (5 percent molar excess) of the N-carboxy anhydride of phenylalanine in one portion with rapid blending at a temperature of from 0°-2°C, and blending is continued for one minute while maintaining the pH between 10.5 and 10.4 by the addition of 5 N potassium hydroxide. At the end of the reaction period a drop of capryl alcohol is added as an antifoaming agent. The pH is then reduced to 3.5 by the addition of concentrated sulfuric acid and nitrogen is passed through the mixture for 10 minutes. The pH is raised to 10.2 with concentrated potassium hydroxide, and a 0.1 ml. aliquot of the reaction mixture containing prolyl-($C_{14}$) arginine is withdrawn.

To the resulting mixture, 300.5 mg. (6.5 percent molar excess) of the N-carboxy anhydride of proline is added with rapid stirring at a temperature of from 0°-2°C. Reaction is continued for one minute while maintaining the pH at 10.2-10.1 with 5 N potassium hydroxide. Decarboxylation is effected at pH 3.0 in the same manner as described above. The pH is next increased to 10.2 with concentrated potassium hydroxide and a 0.1 ml. aliquot containing glycyl-prolyl-phenylalanyl-($C^{14}$) arginine withdrawn for analysis.

The tetrapeptide is converted to the N-carboxy peptide of alanyl-glycyl-prolyl-phenylalanyl-($C^{14}$) arginine by the addition of 248 mg. (8 percent molar excess) of the N-carboxy anhydride of alanine to the reaction mixture at 0°-2°C with rapid stirring. Reaction is continued for one minute while maintaining pH 10.2-10.0 with 5 N potassium hydroxide, and the N-carboxy peptide decarboxylated at pH 3 as described above. The pH is increased to 10.2 with aqueous concentrated potassium hydroxide and a 0.1 ml. aliquot containing the desired compound withdrawn for analysis.

To the reaction mixture there is then added 340 mg. of N-carboxyvaline anhydride with rapid stirring at 0°-2°C. Reaction is continued for 2 minutes while maintaining the pH at from 10.3 to 10.0 with 5 N potassium hydroxide. The pH is then adjusted to 6.5 with concentrated sulfuric acid and a 0.2 ml. aliquot containing the desired radioactive hexapeptide withdrawn for analysis.

Each of the aliquots collected above is chromatographed on paper using the system butanol-acetic acid-water in the ratio 4:1:5. The chromatograms are scanned with a radioactivity strip scanner. The results indicate that each of the desired reactions proceeds in greater than 85 percent yield to produce a product which is substantially uncontaminated by side reactions.

The reaction mixture is freeze dried, the residue extracted three times with 150 ml. fractions of methanol and the combined fractions concentrated to dryness in vacuo at 40°C. The residue is taken up into 2 ml. of water and one-fourth of the solution is diluted to 1 l. This diluted solution is chromatographed on 200 ml. of a carboxylic ion exchange column (CG-50 available from Rohm & Haas, Philadelphia; 2.2 cm. diameter; 55 cm. height) on the hydrogen cycle. The column is fed with the solution at 2.5 ml. per minute and subsequently washed to collect 2 l. of water. The column is eluted with 0.01 N sulfuric acid. The efluent stream is monitered for $C^{14}$ isotope using an anthracene column, initially fed at a rate of 0.2 ml. per minute. The feed rate is gradually increased to 0.6 ml. per minute during a period of 20 hours, and the rate kept constant to the end of the run. The eluent is collected in 24 ml. fractions and the desired product is obtained from fractions 25 through 72 by adjusting the pH to 9.5 with 50 percent sodium hydroxide and freeze drying. The residue is extracted with methanol, the extract concentrated to dryness in vacuo at 40°C. The residue is dissolved in a small amount of water, and the pH adjusted to 3.5 with concentrated hydrochloric acid. The solution is freeze dried to give the desired product which is recrystallized from water-ethanol.

EXAMPLE 18

A total of 3 mM of phenylalanine amide is taken up in 30 ml. of potassium borate buffer at pH 10.2. The solution is cooled to 0°C and 3 mM of N-carboxy aspartic acid anhydride added while stirring rapidly in a blender. Reaction is continued for one minute and the pH adjusted to 4 with concentrated sulfuric acid while passing a stream of nitrogen through the mixture.

After 4 minutes at pH 4, the hydrogen ion concentration is adjusted to pH 10.2 by the addition of concentrated potassium hydroxide. The mixture is again cooled to 0°C and 3.45 mM of N-carboxy methionine anhydride added with rapid stirring. At the end of 3 minutes the pH is adjusted to 4 with concentrated sulfuric acid and a stream of nitrogen is bubbled through the mixture for 15 minutes.

The precipitate which forms during decarboxylation is dissolved by adjusting the pH to 10.2 with concentrated potassium hydroxide. The solution is cooled to 1°C and 4.6 mM of N-carboxy tryptophane anhydride added with rapid stirring. The pH is held at 10.2 by intermittend addition of aqueous potassium hydroxide. The mixture is clarified by filtration and the pH of the filtrate adjusted to 2.0 by the addition of concentrated hydrochloric acid.

The solids are removed by filtration. The solution (approximately 50 ml.) is chromatographed on a 1,000 g. Sephadex G-25 column (fine bead-7.5 cm. diameter 100 cm. length). The column is developed with deionized water while collecting 100 ml. fractions. Fractions No. 39 and 40 contain the unreacted tripeptide methionyl-aspartyl-phenylalanyl amide. Other minor fractions of undetermined structure are collected from fractions 41 through 59. The desired product is obtained from combined fractions 60 through 64, by adjustment of the original pH (7.4) to 2 with concentrated hydrochloric acid followed by freeze drying. The identity and optical integrity of the product is established by Spinco analysis and by enzymatic hydrolysis with leucine aminopeptidase, an enzyme specific for L-amino acids. The Spinco analysis establishes that the expected amino acids are present in the anticipated proportions. The enzymatic hydrolysis mixture is analyzed by thin layer chromatography using ninhydrin as the test reagent. On the chromatogram there are spots corresponding to each of the starting amino acids, there are no spots corresponding to intermediates and no spots corresponding to product. These last two factors are most important. If any optical inversion had taken place during the course of the reaction either products or intermediates or both would be found on the chromatogram. The reason for this is that the enzymatic hydrolysis would stop at the inverted amino acid, because of the optical specificity of the enzyme.

EXAMPLE 19

Use of Miscible and Immiscible Solvents

An apparatus is constructed of glass tubing. It consists of a horizontal section with an expanded, bubble like segment centrally located. A section of glass tubing leading to a beaker in an ice-salt mixture depends from the expanded section and communicates with it. On both ends of the horizontal section there are upwardly extending sections fitted to hold hypodermic syringes. The syringes contain previously cooled solutions of the reactants in either miscible or immiscible solvents. The syringes are activated simultaneously so that the solutions reach the expanded portion at substantially the same time. Due to their velocity, the solutions set up turbulence in the reaction zone so that the reactants are intimately mixed. Reaction takes place and the N-carboxy peptide flows through the downwardly extending tubing into the beaker. After about two minutes, decarboxylation is effected in the beaker by the addition of concentrated hydrochloric acid with rapid stirring while bubbling nitrogen through the mixture.

In one such experiment 85 mg. (0.44 mM) of N-carboxy-phenylalanine anhydride in 2 ml. of dioxane and 18 ml. of water previously cooled to about 3°C is placed in one syringe and 42 mg. (0.40mM) of serine in 20 ml. of potassium borate is placed in the other. The solutions are brought together in the reaction zone and allowed to flow into the beaker. At the end of 90 seconds the product is decarboxylated in the beaker at pH 3 with concentrated hydrochloric acid with rapid stirring while bubbling a steady stream of nitrogen through the mixture for 15 minutes. The mixture is then freeze dried and the residue extracted with methanol. The methanol solution is chromatographed on a silica gel column and the column is developed with 4:1:5 n-butanol-acetic acid - water. The first fractions contain phenylalanine, the middle fractions the desired product and the last fractions contain unreacted serine.

In a similar experiment the dioxane is replaced with ethyl acetate. After decarboxylation, the ethyl acetate layer is separated and the product recovered from the water layer as in the foregoing procedure.

EXAMPLE 20

Bradykinin

Arginyl-prolyl-prolyl-glycyl-phenylalanyl-seryl-prolyl-phenylalanyl-arginine

Seryl-prolyl-phenylalanyl-arginine 15.75 gm. of arginine.HCl (75 mM) is dissolved in 2.62 l. of pH 10 sodium borate buffer, the pH is adjusted to 3 with concentrated sulfuric acid and nitrogen bubbled in for 10 minutes. The pH is raised to 10.2 with 50 percent sodium hydroxide and the solution cooled to 0°C. 400 gm. of ice is added followed by 82.5 mM of N-carboxy phenylalanine anhydride dissolved in 200 ml. acetone. After stirring vigorously for 1 minute the solution is acidified to pH 3 and nitrogen bubbled in for 10 minutes. The pH is then adjusted to 9.5 and 15.9 gm. (112.5 mM) of N-carboxy proline anhydride in 150 ml. acetone is added plus 400 gm. ice to maintain 0°C. temperature. The solution is vigorously stirred for 1 minute and decarboxylated as above. The product is not isolated. The process is repeated at pH 9.3 with the addition of 34 gm. (150 mM) of O-trifluoroacetyl-N-carboxy serine anhydride in 150 ml. acetone. After blending for 1 minute the pH is adjusted to 7 and freeze-dried. The total solids are extracted three times with methanol and the methanol extracts adsorbed on silica gel and taken to dryness. The silica gel is then added to a silica gel column prepared in isopropanol. The column is developed with methanol, 80 parts:water, 18 part:ammonia, 2 parts. The desired tetrapeptide is isolated from fractions 18–21 and the structure is confirmed by a Spinco analysis.

Phenylalanyl-seryl-prolyl-phenylalanyl-arginine 1.8 gm. of seryl-prolyl-phenylalanyl arginine (3.56 mM) is dissolved in 125 ml. of sodium borate buffer at pH 9.5, cooled to 0°C. and 70 gm. ice added to maintain temperature. 755 mg. (3.92 mM) of N-carboxy phenylalanine anhydride is dissolved in acetone and added to the buffered solution with vigorous stirring. The pH is adjusted to 7 and the total reaction put on a 40 ml. carbon column. The column is washed with 500 ml. water and subsequently eluted with ammonium hydroxide until the gractions give a negative ninhydrin test. The fractions which contain the desired material are freeze dried. The solid residue is chromatographed on a silica gel column. The column is developed with sec.-butanol, 6 parts:water, 3 parts:acetic acid, 1 part. Fractions 6–9 contain the desired pentapeptide. The structure is confirmed by a Spinco analysis.

Prolyl-prolyl-glycine 1.5 gms. (20 mM) glycine is dissolved in 250 ml. of sodium borate buffer at pH 10 and cooled to 0°C. 50 gms. of ice is added followed by the addition of 2.82 gms. (20 mM) N-carboxy proline anhydride in 20 ml. of acetone. The reaction is stirred vigorously for 1 minute and the pH lowered to 3 with concentrated sulfuric acid. Nitrogen is bubbled in for 10 minutes and the pH adjusted to 10 by the addition of 50 percent sodium hydroxide. The solution is cooled to 0°C., 50 gms. of ice and 3.1 gms. (22 mM) of N-carboxy proline anhydride in 25 ml. acetone added. After blending for 1 minute the pH is lowered to 7 and the mixture freeze dried. The product is desalted by extracting 3 times with 25 ml. methanol and the methanol extracts are adsorbed on IRC-50 resin and developed with acetic acid/water. The product is crystallized from water/acetone. 2.5 gms. (9.3 mM) of the isolate, prolyl-prolyl-glycine is dissolved in 2.5 N sodium hydroxide such that the pH of the solution is 10 and cooled to 0°–5°C. 1.75 gm. (10.4 mM) of carbobenzoxy chloride is added dropwise with vigorous stirring. The temperature is maintained at 0°C. and the pH kept at 10 by the addition of 2.5N sodium hydroxide. After the pH remained constant the reaction is stirred for an additional 30 minutes. The reaction is extracted 2 × 10 ml. with ether to remove excess acid chloride and then acidified to Congo Red with 2.5N hydrochloric acid. An oil separates and is crystallized from chloroform.

2.85 gm. (7 mM) carbobenzoxy prolyl-prolyl-glycine is dissolved in 15 ml. dioxane and 800 mg. (7 mM) of hydroxy-succinimide added to the solution. 1.4 gm. (7 mM) of N,N-dicyclohexylcarbodiimide is added and the reaction refrigerated overnight. The dicyclohexylurea is filtered off and washed with dioxane. The filtrate is concentrated to an oil which is crystallized from ethyl acetate/petroleum ether.

A solution of 652 mg. (1 mM) of pentapeptide plus 168 mg. (2 mM) sodium bicarbonate in 2 ml. water is prepared. To this is added 50 mg. (1 mM) of the N-hydroxysuccinimide ester of carbobenzoxy prolyl-prolyl-glycine dissolved in 3 ml. ethanol. The reaction mixture is kept at room temperature overnight. After acidification to pH 2 with hydrochloric acid, the ethanol is removed in vacuum and to precipitate an oil. The oil is separated from the aqueous layer, dissolved in ethyl acetate, washed with water, dried over magnesium sulfate and concentrated to dryness to yield 565 mg. of carbobenzoxy-octapeptide.

485 mg. of carbobenzoxy-octapeptide (.462 mM) is dissolved in 10 ml. of glacial acetic acid and 500 mg. of 10 percent palladium on charcoal catalyst added. The compound is hydrogenated at 40 pounds pressure for 2 hours. The catalyst is removed and the solution concentrated to an oil. Thin layer chromatography shows the product is still the protected peptide. The oil is redissolved in 30 ml. glacial acetic acid and 500 mg.

of 10 percent palladium on charcoal again added. The reaction is then hydrogenated overnight at 40 pounds pressure. The catalyst is removed and the reaction concentrated to dryness to yield 167 mg. of unprotected prolyl-prolyl-glycyl-phenylalanyl-seryl-prolyl-phenylalanyl arginine.

48 mg. of octapeptide is dissolved in 1.8 ml. pH 10 buffer and the pH adjusted to 9.5 at 0°C. To this solution is added 0.3 ml. of N-carboxy arginine anhydride in dimethylformamide. The amount of NCA added is a 100 percent excess. After blending for 1 minute the pH is adjusted to 6.3 and the reaction freeze dried. The freeze dried solid is desalted by methanol extraction and put on Amberlite IRC-50 resin column and the desired nonapeptide eluted with 25–50 percent acetic acid in water. After freeze-drying fractions 13–15, 17.9 mg. of bradykinin is isolated which is dissolved in 7 ml. methanol, centrifuged to remove some insolubles, concentrated at room temperature to a small volume, and an amorphous solid precipitated by the addition of ether. The product is centrifuged, washed with ether and dried under vacuum. A Spinco amino acid analysis confirmed the structure.

EXAMPLE 21

Phenylalanyl-glycyl-leucyl-valyl-glycine

A dry mixture containing 2.02 mM of the N-carboxy-anhydride of phenylalanine and 2 mM of glycyl-leucyl-valyl-glycine is added in one portion to 20 ml. of a rapidly stirred aqueous potassium borate buffer at pH 9 and 0°C. The mixture is stirred for 45 seconds and the pH adjusted to 4 with concentrated sulfuric acid at 0°C. while passing a stream of nitrogen through the mixture for about 10 minutes.

The product is recovered by freeze drying, followed by extraction of the residue with methanol. The methanol solution is developed with 4:1:5 n-butanol-acetic acid-water.

EXAMPLE 22

Tyrosyl-leucyl-(D)-phenylalanine

A mixture of 3 m moles of D-phenylalanine in 30 ml. of aqueous potassium borate buffer containing 5 g. of ice at pH 10.5 is cooled at 3°C. and 3.2 m moles of solid N-carboxy leucine anhydride added with rapid stirring. Reaction is continued for 30 seconds and the pH adjusted to 3 with concentrated sulfuric acid at 0°C. while passing a stream of nitrogen through the mixture. The product leucyl-phenylalanine is not isolated.

The pH of the mixture is adjusted to 10.0 by the addition of concentrated potassium hydroxide and 3.4 m moles of tetrahydropyranyl-tyrosine-N-carboxy anhydride added with rapid stirring while maintaining the temperature at approximately 0°C. Reaction is continued for 1 minute and the decarboxylation effected by adjusting the pH to 3 with sulfuric acid. The mixture is allowed to come to room temperature and held for one hour to remove the protecting group. The desired product is isolated chromatographically on a silica gel column.

EXAMPLE 23

β-(3,4-Dihydroxyphenyl-L-alanyl-phenylalanyl-glycyl-leucyl-valyl-glycine

The product from Example 21 (2.02 mM) is taken up in 30 ml. of potassium borate buffer at pH 10. The solution is cooled to 0°C and 3mM of the di-tetrahydropyranyl ether of N-carboxy-62-(3,4-dihydroxyphenyl)-L-alanine (DOPA) is added while stirring rapidly in a blender. Reaction is continued for 1 minute and the pH adjusted to 4 with concentrated sulfuric acid while a stream of nitrogen is passed through the mixture. The passage of nitrogen is continued for 20 minutes. The mixture is then allowed to come to room temperature and held for 1 hour. The product is isolated chromatographically.

EXAMPLE 24

Isoleucyl-valyl-glycyl-epinephrine

A mixture of 3mM of epinephrine in 30 ml. of aqueous potassium borate buffer containing 5 g. of ice at pH 10 is cooled to 0°C and 3.01 mM of N-carboxy glycine anhydride is added with rapid stirring. Reaction is continued for 40 seconds and the pH reduced to 4 with sulfuric acid at 2°C while bubbling nitrogen through the mixture for 20 minutes. The product glycyl-epinephrine is not isolated.

The following table describes the procedure by which glycyl-epinephrine is converted to the final product.

| NCA | mM | pH | Temp. | Time | $-CO_2$ pH |
|---|---|---|---|---|---|
| VAL | 3.1 | 10 | 2°C | 1 min. | 3 |
| ILEU | 3.4 | 10.5 | 0°C | 45 sec. | 4 |

The product is isolated chromatographically.

EXAMPLE 25

Glycyl-leucyl-valyl-α-naphthylamine

A mixture of 2.0 mM of α-naphthylamine in 30 ml. of acetic acid-sodium acetate buffer at pH 4.6 is cooled to 5°C and 2.03 mM of N-carboxy valyl anhydride is added with rapid stirring. The carbamate of valyl-α-naphthylamine which forms decarboxylates spontaneously. The mixture is swept with nitrogen for 20 minutes. The pH is then adjusted to 10 by the addition of aqueous sodium hydroxide and 2.3 mM of N-carboxy leucine anhydride is added with rapid stirring at a temperature of 2°C. The pH is then adjusted to 3 with sulfuric acid to effect decarboxylation and the mixture swept with nitrogen for 15 minutes. At the end of this period the pH is adjusted to 9.5 with sodium hydroxide and 2.9 mM of N-carboxy glycine anhydride is added with rapid stirring at 3°C. The pH is then reduced to 3 with concentrated sulfuric acid and the mixture swept with nitrogen for 20 minutes. The product is isolated chromatographically on a silica gel column.

What is claimed is:

1. The process for the controlled stepwise synthesis of peptides and protected derivatives thereof which comprises reacting a starting amino compound selected from the group consisting of amino acids, peptides, and derivatives thereof wherein additional functional groups are protected, with an NCA reagent selected from the group consisting of N-carboxy amino acid anhydrides, and derivatives thereof wherein additional functional groups are protected, said reaction being conducted by bringing together said amino compound and said NCA reagent in an aqueous medium while maintaining the pH at the protecting pH (whereby the only amino group present in appreciable concentration in reactive form during the course of the reaction is the amino group of the starting amino compound which is to participate in the reaction with the said NCA reagent) thereby forming the corresponding N-carboxy peptide and, decarboxylating by acidification, standing, heating or freeze-drying said N-carboxy peptide.

2. The process, as defined in claim 1, for the controlled stepwise synthesis of peptides and protected derivatives thereof having four amide linkages which comprises reacting a starting material selected from the group consisting of tetrapeptides, and derivatives thereof wherein additional functional groups are protected, with an NCA reagent selected from the group consisting of N-carboxy amino acid anhydrides, and derivatives thereof wherein additional functional groups are protected, said reaction being conducted by bringing together said starting material and said NCA reagent in an aqueous medium under conditions of controlled pH (such that the only amino group present in appreciable concentration in reactive form during the course of the reaction is the amino group of the starting material which is to participate in the reaction with the said NCA reagent) thereby forming the corresponding N-carboxy peptide, and decarboxylating by acidification, standing, heating or freeze-drying said N-carboxy peptide.

3. The process as defined in claim 1 wherein the synthesized peptide or protected derivative thereof contains an aspartic acid or glutamic acid segment, and the NCA reagent is N-carboxy aspartic acid anhydride or N-carboxy glutamic acid anhydride.

4. The process as defined in claim 1 wherein the reaction is conducted at a protecting pH of from about 4 to about 11.

5. The process for the controlled stepwise synthesis of peptides and protected derivatives thereof which comprises adding an NCA reagent selected from the group consisting of N-carboxy amino acid anhydrides, and derivatives thereof wherein additional functional groups are protected, to an aqueous medium containing a pH controlling buffer and a starting amino compound selected from the group consisting of amino acids, peptides, and derivatives thereof wherein additional functional groups are protected, under conditions of intimate mixing at a protecting pH of from 4 to 11 (such that the only amino group present in appreciable concentration in reactive form during the course of the reaction is the amino group of the starting amino compound which is to participate in the reaction with the said NCA reagent) thereby forming the corresponding N-carboxy peptide, and reacting resulting peptide (following decarboxylation by acidification, standing, heating or freeze-drying) with NCA reagent as defined hereinabove under reaction conditions as aforesaid.

6. The process as defined in claim 5 wherein the pH controlling buffer is a borate buffer, and wherein the protecting pH, designed for stabilization of the carbamate protecting group, is from about 8 to about 10.5.

7. The process as defined in claim 5 for the controlled stepwise synthesis of peptides and protected derivatives thereof which comprises adding an NCA reagent selected from the group consisting of N-carboxy amino acid anhydrides, and derivatives thereof wherein additional functional groups are protected, to an aqueous medium containing a starting amino compound selected from the group consisting of amino acids, peptides, and derivatives thereof wherein additional functional groups are protected, under conditions of intimate mixing at a protecting pH of from 4 to 6 (such that, using protonation to protect the amino group, the only amino group present in appreciable concentration in reactive form during the course of the reaction is the amino group of the starting amino compound which is to participate in the reaction with the said NCA reagent) thereby forming the corresponding N-carboxy peptide, and reacting resulting peptide (following decarboxylation by acidification, standing, heating or freeze-drying) with NCA reagent as defined hereinabove under reaction conditions as aforesaid.

8. The process as defined in claim 5 for the controlled stepwise synthesis of peptides and protected derivatives thereof which comprises adding an NCA reagent selected from the group consisting of N-carboxy amino acid anhydrides, and derivatives thereof wherein additional functional groups are protected, to an aqueous medium containing a starting amino compound selected from the group consisting of amino acids, peptides, and derivatives thereof wherein additional functional groups are protected, under conditions of intimate mixing while concurrently adding sufficient alkaline reagent to said medium to maintain a protecting pH (so that the only amino group present in appreciable concentration in reactive form during the course of the reaction is the amino group of the starting amino compound which is to participate in the reaction with the said NCA reagent) thereby forming the corresponding N-carboxy peptide, and reacting resulting peptide (following decarboxylation by acidification, standing, heating or freeze-drying) with NCA reagent as defined hereinabove under reaction conditions as aforesaid.

9. The process as defined in claim 1 wherein the reaction is conducted by adding a mixture of said NCA reagent together with said starting amino compound to said aqueous medium under conditions of intimate mixing and at the protecting pH.

* * * * *